US011120374B2

(12) United States Patent
Campbell et al.

(10) Patent No.: US 11,120,374 B2
(45) Date of Patent: Sep. 14, 2021

(54) MEMORIAL EVENT MANAGEMENT SYSTEM

(71) Applicant: CRäKN, LLC, Cincinnati, OH (US)

(72) Inventors: Clifford James Campbell, Cincinnati, OH (US); Matthew Garett Howes, Cincinnati, OH (US); John K. Sentz, Livingston, TX (US); Gordon Scott Mindrum, Cincinnati, OH (US)

(73) Assignee: CRÄKN, LLC, Cincinnati, OH (US)

( * ) Notice: Subject to any disclaimer, the term of this patent is extended or adjusted under 35 U.S.C. 154(b) by 40 days.

(21) Appl. No.: 16/594,818

(22) Filed: Oct. 7, 2019

(65) Prior Publication Data

US 2020/0311651 A1    Oct. 1, 2020

Related U.S. Application Data

(60) Provisional application No. 62/742,562, filed on Oct. 8, 2018.

(51) Int. Cl.

| | |
|---|---|
| *G06F 16/25* | (2019.01) |
| *G06Q 10/06* | (2012.01) |
| *G06Q 10/10* | (2012.01) |
| *G06Q 50/26* | (2012.01) |
| *G06Q 50/00* | (2012.01) |
| *G06Q 30/00* | (2012.01) |

(Continued)

(52) U.S. Cl.
CPC ... *G06Q 10/063114* (2013.01); *G06F 3/0481* (2013.01); *G06F 3/04883* (2013.01); *G06F 3/167* (2013.01); *G06F 16/252* (2019.01);

*G06F 16/51* (2019.01); *G06F 40/174* (2020.01); *G06K 9/00288* (2013.01); *G06Q 10/1095* (2013.01); *G06Q 30/0185* (2013.01); *G06Q 50/01* (2013.01); *G06Q 50/26* (2013.01); *G06Q 50/28* (2013.01); *G08B 21/24* (2013.01); *H04W 4/029* (2018.02); *G06Q 30/016* (2013.01)

(58) Field of Classification Search
CPC . G06Q 10/063114; H04W 4/029; G06F 16/51
See application file for complete search history.

(56) References Cited

U.S. PATENT DOCUMENTS

| | | | |
|---|---|---|---|
| 10,275,140 B1* | 4/2019 | Miller | G06F 16/447 |
| 10,706,735 B2* | 7/2020 | Smith | G09B 7/06 |

(Continued)

*Primary Examiner* — David E Choi
(74) *Attorney, Agent, or Firm* — Frost Brown Todd LLC

(57) ABSTRACT

An intake management system provides a number of tools and features to memorial event providers. The intake system is configured to provide appropriate and necessary intake forms to an event planner via configured devices, and may also pre-populate fields of the forms based upon information from an automatically generated intake dossier, from friends and family of the memorialized person, and from custom configured rules. During an event planning interview, the system provides tools and features that provide flexibility to planners in order to increase the accuracy of event details and improve customer experience. This system may be combined with custody tracking of remains during event preparation, which may be implemented within a custody tracked environment in order to track remains, reduce mistakes, and drive event management based upon transit between areas of the tracked environment.

20 Claims, 13 Drawing Sheets

(51) Int. Cl.
*G06Q 50/28* (2012.01)
*G06F 40/174* (2020.01)
*G06F 3/0481* (2013.01)
*G06F 3/0488* (2013.01)
*G06F 3/16* (2006.01)
*G06K 9/00* (2006.01)
*H04W 4/029* (2018.01)
*G08B 21/24* (2006.01)
*G06F 16/51* (2019.01)

(56) References Cited

U.S. PATENT DOCUMENTS

| | | | | |
|---|---|---|---|---|
| 2004/0205515 | A1* | 10/2004 | Socolow | G06F 40/166 715/202 |
| 2011/0054978 | A1* | 3/2011 | Mohil | G06Q 10/06 705/7.18 |
| 2015/0058324 | A1* | 2/2015 | Kauwe | G06F 16/284 707/722 |
| 2015/0227856 | A1* | 8/2015 | Hoang-To | G06Q 30/0283 705/5 |
| 2016/0087919 | A1* | 3/2016 | Mendez | H04L 51/14 709/206 |
| 2018/0052919 | A1* | 2/2018 | Feldman | G06Q 30/0623 |
| 2019/0095848 | A1* | 3/2019 | Komatsu | G06Q 10/063114 |
| 2020/0311651 | A1* | 10/2020 | Campbell | G06F 40/174 |

* cited by examiner

MEMORIAL EVENT MANAGEMENT SYSTEM

PRIORITY

This application claims the benefit of U.S. Provisional Patent Application 62/742,562, filed on Oct. 8, 2018, and entitled "Memorial Event Management, which application is hereby incorporated by reference in its entirety.

FIELD

The disclosed technology pertains to a system for managing aspects of memorial events.

BACKGROUND

For many memorial events, such as those dedicated to a recently deceased person, time is of the essence. With just a few days to plan and prepare for such events, there is significant pressure on both the grieving family of the decedent and the staff providing memorial event services that can negatively impact decision making processes and performance of various duties. With very little margin for error, memorial event service providers should have skilled personnel and robust plans and processes in place in order to involve the grieving family in the planning process, and then ensure the performance of the multitude of tasks and services that are required in the lead up to the start of the event.

For example, in some cases a memorial event service provider may only have about seventy hours to plan an event, invite attendees, ensure that a decedent's remains are transported and prepared in accordance with various laws and regulations, obtain and prepare a casket, obtain and prepare a burial site, obtain permits and escorts for a funeral procession, arrange for seating, shade, shelter, or refreshments at visitation sites, burial sites, and elsewhere, and numerous other tasks. With such a brief time frame and multiple persons responsible for different tasks, who may be directly employed by the memorial event provider or contracted from outside service providers, the possibility for and consequences of an error are significant.

Despite the critical nature and timing of such tasks, memorial event providers, such as funeral homes, have conventionally used manual processes and systems to ensure the proper planning and performance of memorial events. As one example, when meeting with the family of a decedent, paper forms are often used to capture the details of the deceased and the desired memorial event. This paper form may never enter an electronic system, and instead may physically travel to various places to serve as a checklist for the arrangement or performance of tasks. If lost or confused with another form, critical tasks may not be performed in time for the memorial event, or in some cases may be performed for the wrong decedent. The gravity of such mistakes can vary from delivering the wrong type of flowers to a burial site, to cremating a decedent's remains that were instead intended for burial.

What is needed, therefore, is an improved system for managing the planning and performance of memorial events.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of managing the planning and performance of memorial events. While the disclosed applications of the inventors' technology satisfy a long-felt but unmet need in the art of the planning and performance of memorial events, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

One or more aspects of the disclosed technology may be implemented in order to improve and provide advantages over conventional practices in memorial event planning, management, and performance. Such aspects may be implemented as standalone features or systems, or may be integrated with other systems (e.g., a memorial event service providers pre-existing customer relation management system or sales system). One example of a system that may integrate or be integrated with aspects disclosed herein is described in U.S. Pat. Pub. 2016-0283877, entitled "Death Care Management System and Method," published Sept. 29, 2016, the entirety of which is incorporated herein by reference.

I. Exemplary System and Methods for Intake Management

Figure 1:
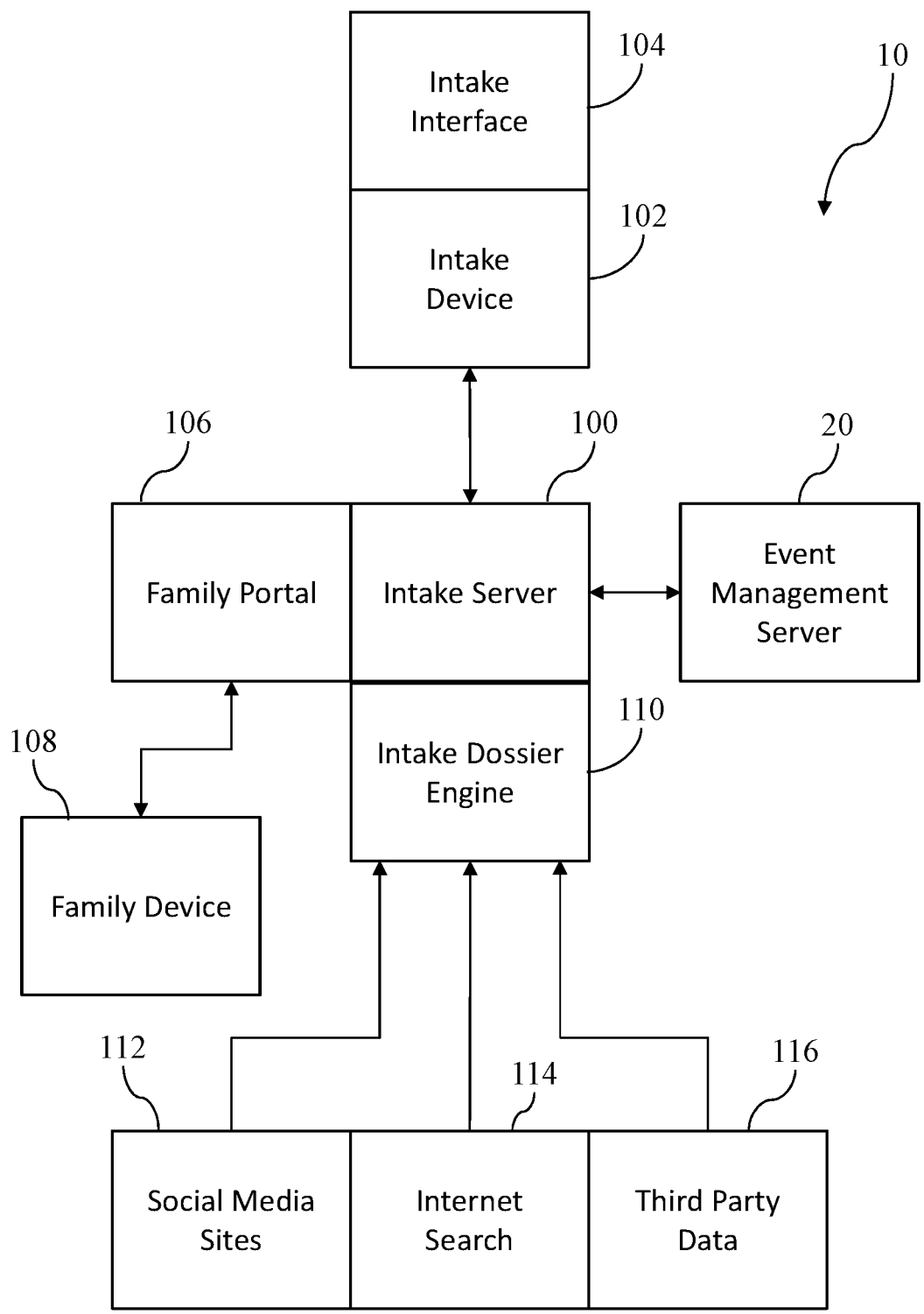
FIG. 1 is a schematic diagram of an exemplary intake system configured to manage aspects of memorial events.

Turning now to the figures, FIG. 1 shows a schematic diagram of an exemplary intake system (10) configured to manage aspects of memorial events. An intake server (100) may be one or more physical, virtual, or cloud servers configured to communicate, store, and process data. The intake server (100) is in communication with an intake device (102) and an event management server (20), and is also configured to operate an intake dossier engine (110) and provide a family portal (106) that is accessible using a family device (108).

The intake server (100) may be configured to provide a variety of memorial event management features disclosed herein, including improved and automated intake features and custody tracking features. The event management server (20) may be the same or a different server from the intake server (100) (e.g., the features of both servers may be hosted in the same cloud computing environment, or hosted from the same physical server). Various examples of the components and features of the event management server (20) are described in U.S. Pat. Pub. 2016-0283877, entitled "Death Care Management System and Method," published Sep. 29, 2016, the entirety of which is incorporated herein by reference.

As one example of an integration between the intake server (100) and the event management server (20), the intake server (100) may provide features such as automated intake of customers in order to produce datasets describing a particular memorial event desired by the customer. Such data may be provided to the event management server (20), which provides features and interfaces to aid service providers in performing tasks related to the memorial event. As another example, the intake server (100) may be configured to track custody of a decedent's remains throughout the preparations for a memorial event, and such tracking may be used by the intake server (100) and/or event management server (20) to verify completion of tasks or drive completion of tasks. Other ways in which the intake server (100) and event management server (20) may be integrated will be apparent to one of ordinary skill in the art in light of the disclosure herein.

The intake device (102) may be a smartphone, tablet, laptop computer, kiosk device, or proprietary device having features and capabilities that would allow a user to receive information from the intake device and provide inputs to the intake device (102). The intake device (102) may be configured to provide an intake interface (104) to a user, which may be used to view information relating to customer intake from the intake server (100), and to provide information that may be received by the intake server (100) as inputs relating to the intake of a customer and creation of a memorial event. The intake interface (104) may be an application (e.g., a mobile device application, a desktop application, or a web application), a website, an API, or another interface allowing for communication of data between the intake server (100) and a user of the intake device (102). The intake device (102) may be used by a memorial event provider to leverage and interact with various features of the intake server (100) in order to improve and mitigate risks associated with planning of a memorial event, as will be described in greater detail below.

Similarly, the family device (108) may be a smartphone, tablet, laptop computer, kiosk device, or proprietary device having features and capabilities that would allow a user to access the family portal (106) to view information and provide user inputs. The family portal (106) may be, for example, a website, an application, an API, or another interface allowing for communication between the family device (108) and the intake server (100). The family portal (106) may be used by a customer to improve customer intake for memorial event services, as will be described in greater detail below.

The intake dossier engine (110) may be configured as an automated process that regularly, or, in reaction to certain events, immediately gathers data from one or more outside data sources such as social media sites (112), internet search engines (114), and third-party data sources (116) (e.g., third party applications or third-party APIs that provide data upon request). The intake dossier engine (110) is operable to provide additional data about new customers and memorial events, in order to provide a more streamlined and more customized intake experience for some customers of memorial events. For example, in some implementations the intake dossier engine (110) may be activated in response to receiving data indicating that a customer has scheduled a meeting with a memorial event provider in order to discuss a memorial event for a "John Smith" who lived in Cincinnati, Ohio, and was born on Jan. 1, 1945. When activated, the intake dossier engine (110) may gather and filter through information in order to identify one or more details that may be associated with John Smith (e.g., his status as a navy veteran, his favorite sports teams, his surviving family). These details may be presented to an event planner via the intake device (102) to provide a more personalized intake experience to the customer, as will be described in greater detail below.

Figure 2:
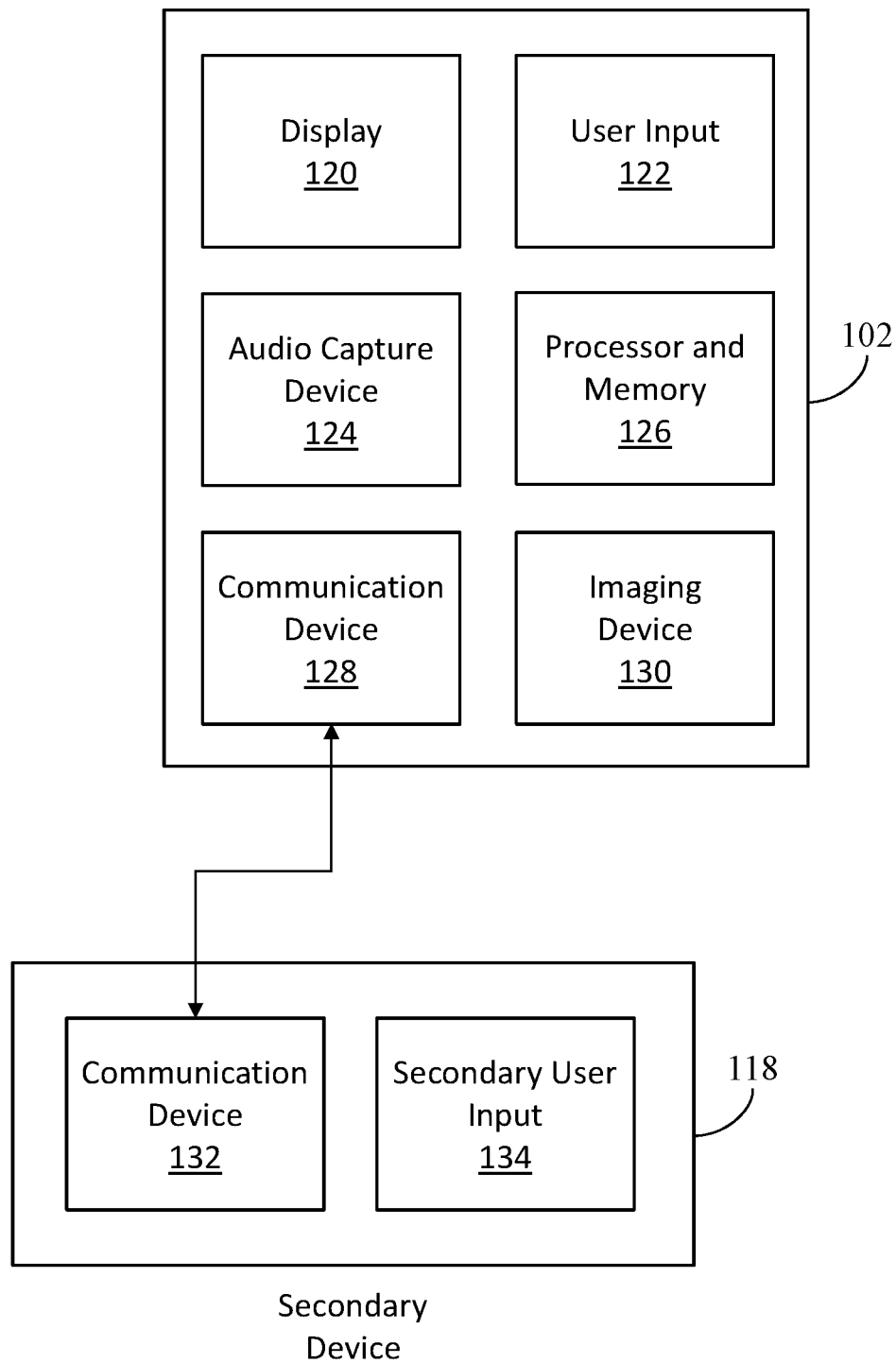
FIG. 2 is a schematic diagram of an exemplary intake device configured to be used with the intake system.

FIG. 2 is a schematic diagram of an exemplary intake device, such as the intake device (102), configured to be used with the intake system (10). The intake device (102) comprises a processor and memory (126), a display (120), a user input (122), an audio capture device (124), a communication device (128), and an imaging device (130). The display may be a visual display such as an LCD or LED screen configured to provide information to a user, while the user input (122) may be a mouse, keyboard, touchscreen, or other input device usable to interact with information shown on the display (120). The processor and memory (126) may be configured to control various features and aspects of the intake device (102), such as the audio capture device (124) or the communication device (128), and may also be configured to execute and provide software applications to a user, such as the intake interface (104).

The communication device (128) may be a wired or wireless communication devices such as Wi-Fi, Bluetooth, or RFID transceiver, which may be configured to communicate with one or more other devices such as the intake server (100), the event management server (20), or a secondary intake device (118). As has been described, the intake device (102) may be used by a memorial event planner to perform tasks related to customer intake and memorial event planning, and to access various features of the intake server (100), such as automated intake. Such features may use the audio capture device (124), which may be an integral or external microphone or other capture device, in order to capture and analyze conversations between a memorial event planner and a customer. Such features may also use the imaging device (130), which may be a camera, optical scanner, or other image capture device, in order to capture and analyze image data associated with a memorial event (e.g., a barcode for certain products, an image of a photograph to be included in materials for a memorial event).

The secondary intake device (118) may be used by a memorial event planner during interactions with a customer when it may not be desirable to hold and interact with the intake device (102). As an example, where the intake device (102) is a tablet device, a customer may take offense if the memorial event planner is looking at and interacting with the intake device (102) during conversations. The secondary intake device (118) comprises a secondary user input (134) configured to be interacted with differently than the user intake device (102), as well as a communication device (132) that is in communication with the user intake device (102) such that user inputs provided via the secondary user input (134) can be passed to the user intake device (102).

The precise form of the secondary intake device (118) will vary by implementation, but some examples include a wearable device such as a smart watch having buttons or touch screen inputs that may be interacted with, a smart pen that captures written information in digital form as it is used, or a proprietary device such as a fob with several buttons that may be kept in a pocket or gripped in a hand. Inputs from the secondary intake device (118) may be complex text (e.g., written data captured from a smart pen device) or simple inputs (e.g., a single click of a button to indicate to the audio capture device (124) that the memorial event planner's next question will concern venues for a memorial event). Other components, features, and forms for the intake device (102) and the secondary intake device (118) exist and will be apparent to one of ordinary skill in the art in light of this disclosure. Additionally, it should be noted that not all implementations will include every component, for example, some implementations of the user intake device (102) may not contain or utilize an imaging device (130), and some implementations of the system may not include the secondary device (118).

Figure 3:
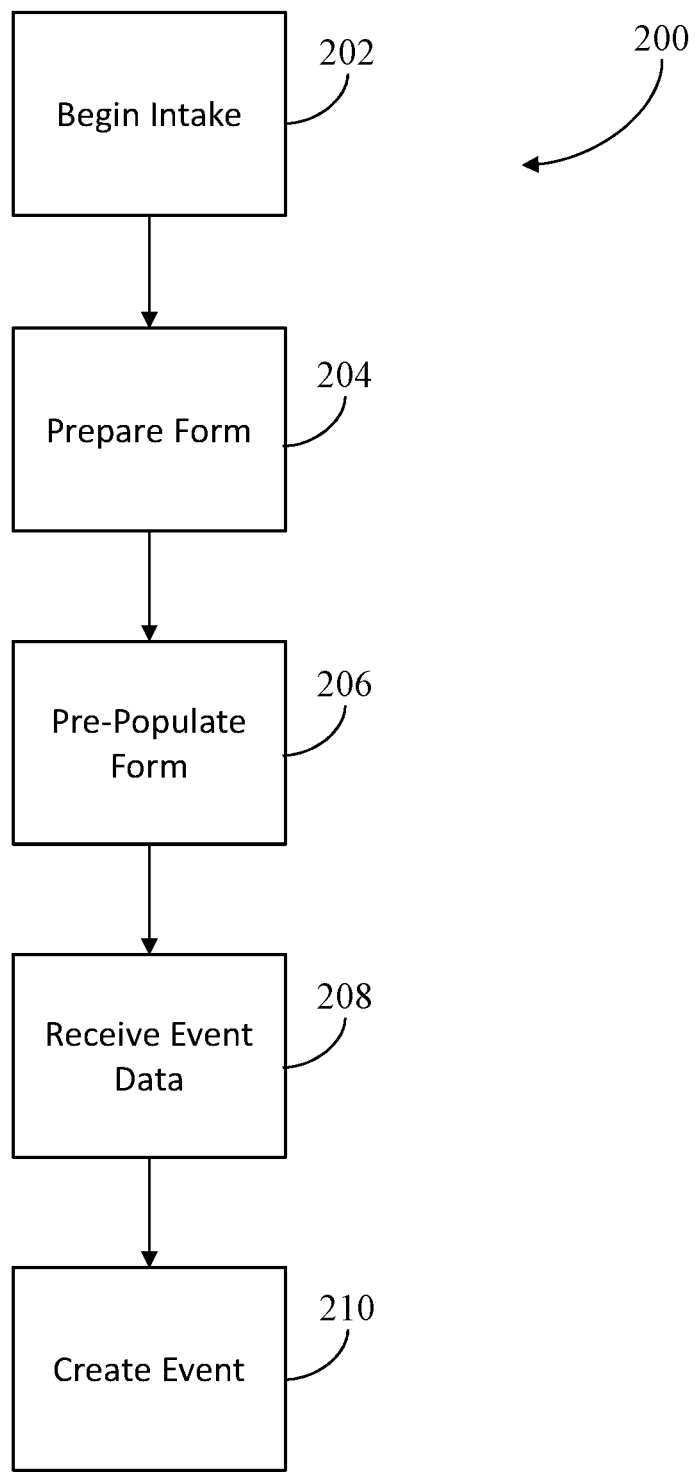
FIG. 3 is a flowchart of an exemplary set of high-level steps that a system could perform to manage aspects of memorial events.

Having described examples of components that may be included in the intake system (10) as well as several features that the intake system (10) may provide, FIG. 3 shows a flowchart of an exemplary set of high-level steps (200) that a system such as the intake system (10) could perform to provide one or more such features and others that aid in the management of memorial events, while FIGS. 4-8 each show exemplary steps that may be performed during one or more of the high-level steps. The steps of FIG. 3 may be performed by or with, for example, the intake server (100) and the intake device (102). Intake of a customer may begin (202) based upon receiving information indicating that a customer wishes to plan a memorial event. This could include information associated with a request for information, a meeting request or a scheduled meeting, for example. The intake system (10) may prepare (204) one or more intake forms for use in planning the memorial event based upon the available information. These intake forms may include forms used by the memorial event provider to plan and provide services (e.g., descriptions, locations, and times of the memorial event) as well as forms that may be required by various laws or regulations (e.g., forms to reserve a public place, conduct a funeral procession, or transport human remains).

The intake system (10) may also pre-populate (206) one or more forms based upon available information from the customer, the family portal, an intake dossier, or elsewhere, prior to the memorial event planner actually meeting with the customer and performing a full interview. During such an interview, the intake device (102) may be used to confirm, update, and enter other information that may be received (208) as event data relating to the memorial event. Once the intake forms have been fully filled, whether automatically or manually, the memorial event may be created (210), and the associated data may be provided to one or more other systems such as the event management server (20).

Figure 4:
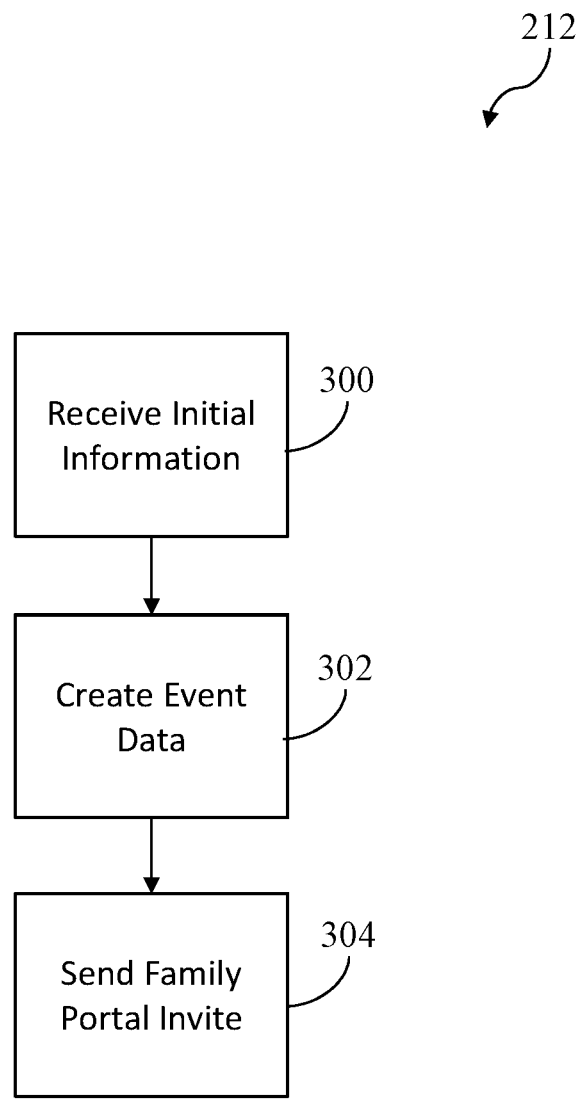
FIG. 4 is a flowchart of an exemplary set of steps that a system could perform to begin an intake for a memorial event.

Turning now to FIG. 4, that figure shows a flowchart of an exemplary set of steps (212) that a system such as the intake system (10) could perform to begin an intake for a memorial event. Initially, some information may be received (300) that is associated with a memorial event. This could include, for example, an electronic request from a customer via a website, a phone request from a customer that is entered into a CRM system to schedule an event planning session, or a set of initial information provided to a receptionist by a walk-in customer. The amount of initial information received (300) may vary, but will generally include a customer name, a name of a person being honored at the memorial event, contact information, and a time and a desired date range for the memorial event.

Such information may then be used to create (302) a set or collection of initial event data and objects that can be used to store and organize later provided data, and also to send (304) an invitation to one or more persons such as the customer and their family to access and use the family portal (106) to provide additional information relating to the memorial event. Such an invitation may be, for example, an electronic message or other message indicating a web site or other location where the person can provide information in a variety of ways. For example, in some cases the family portal (106) may have selection menus, radio buttons, checkboxes, or other interface features that can be used to provide certain statically defined information, as well as text input boxes where free form information may be provided. Information provided via the family portal (106) may be used by the intake system (10) to populate one or more intake forms, as will be described below.

One advantage that may be provided by the intake system (10) is the ability to automate and digitize the intake process and remove reliance upon conventional systems such as paper forms and processes, and generalized electronic systems like CRM systems. In such conventional systems, a memorial event planner may need a variety of forms, which may include forms used internally (e.g., new customer forms) as well as forms provided by regulators (e.g., a funeral procession form). The forms needed may depend upon a variety of factors, such as the city or state in which the memorial event planner is located, the city or state in which the deceased is located, the history and background of the deceased including details such as their religion, military service, the manner of death, and other details. With conventional systems it is difficult to know which forms will be needed prior to interviewing the customer, and printing and obtaining such forms delays completion of the interview, and can lead to important details being lost or miscommunicated.

Figure 5:
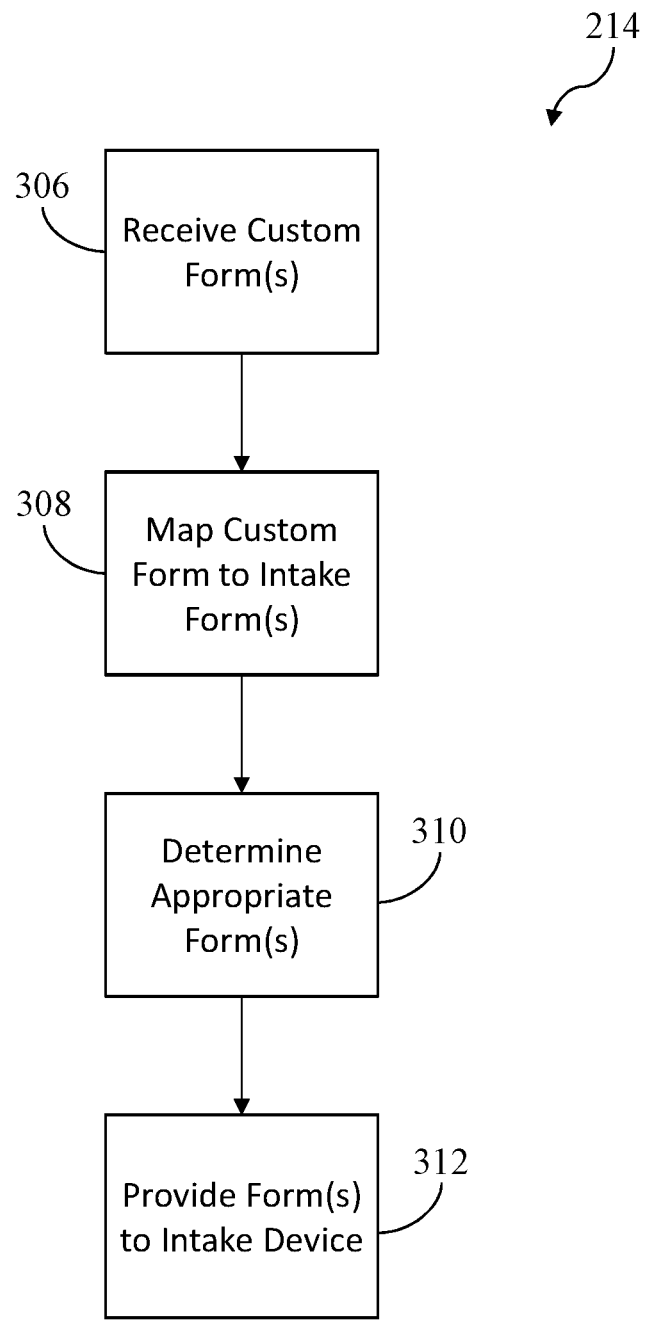
FIG. 5 is a flowchart of an exemplary set of steps that a system could perform to prepare a set of intake forms for the memorial event.

Turning now to FIG. 5, that figure shows a flowchart of an exemplary set of steps (214) that a system such as the intake system (10) could perform to prepare and provide a set of intake forms for the memorial event. The intake system (10) may provide a set of standard forms (e.g., standard new customer forms, or standard regulatory forms provided by a local government) for use by memorial event providers, and may also provide an interface for mapping any custom forms that may be used by a memorial event provider to standard forms and data inputs, such that a particular provider can have great flexibility in the look and layout of forms. Forms may be in a digital format (e.g., an image, word processor document, or portable document)

such that they may be easily printed to paper forms, converted from paper forms, and editable to receive data in one or more fields or inputs.

As shown in FIG. 5, the intake system (10) may determine (310) one or more forms that are required, or may be required, during planning and performance of the memorial event. Needed or potentially needed forms may be determined (310) based upon a variety of factors, including received (300) initial information, information provided in response to an invitation (304) to use the family portal (106), information associated with a particular memorial event provider (e.g., a state, city, or other region that the provider is located within), a type of memorial (e.g., a burial, a cremation), or other information that may be available prior to an intake interview.

As has been described, in some cases, a particular memorial event provider may have custom or proprietary forms that they prefer to use instead of standard forms. This may be because the forms have visual aesthetics personalized for the provider, because the forms have data entry boxes in positions and organizations that are familiar to the provider, or other reasons. In such cases, the intake system (10) may receive (306) one or more custom forms from the memorial event provider, and may map (308) those custom forms to standard forms to allow for easy transition of data from the custom form to the intake system (10). For example, a standard intake form may have a first text input labeled "Customer Name", which the intake system (10) may associate with a particular database table and field. A custom form may have a text input labeled "Surviving Family Member", located elsewhere on the page. By mapping the "Customer Name" input to the "Surviving Family Member" input, the intake system (10) can receive inputs via the custom form and associate them with known data structures and data types.

Mapping of custom forms to standard forms may occur automatically (e.g., based upon optical character recognition, machine learning, or other methods that can identify commonalities between field names or field contents) or manually (e.g., providing an interface to allow memorial event providers to manually associate fields, providing an interface to allow administrators of the intake system (10) to manually associate fields). When determining (310) appropriate forms to provide and associate with a particular intake, the intake system (10) may select both from standard forms, as well as custom form mapping to standard forms, and then may provide (312) the intake forms to a user via the intake device (102) or another device.

Where the intake system (10) determines (310) that a form may possibly be needed, such as where a type of memorial event which impacts the forms that are required has not yet been chosen, each possible form may be provided (312) to the intake device (102) so that they are available on demand, as needed. In some implementations, as forms are subsequently filled during or prior to the intake interview, forms that later become unnecessary may be automatically withdrawn. In this manner, a user of the intake device (102) will throughout various stages of intake only have forms that are at least potentially needed. Forms may be provided (312) to the intake device as files or data stored locally, as cloud stored assets accessible via an application or other interface, or both.

Figure 6:
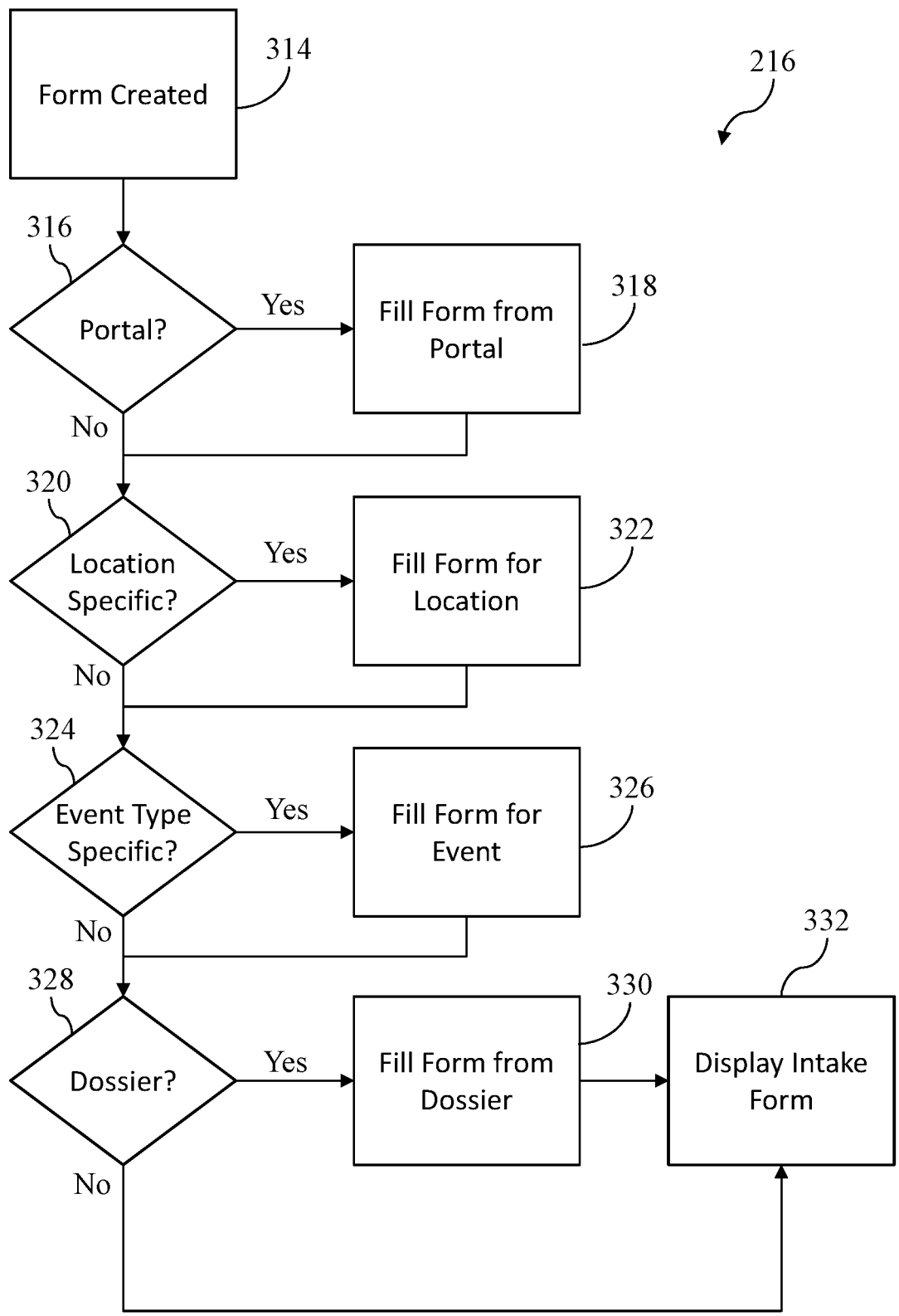
FIG. 6 is a flowchart of an exemplary set of steps that a system could perform to pre-populate the set of intake forms.

Turning now to FIG. 6, that figure shows a flowchart of an exemplary set of steps (216) that a system such as the intake system (10) could perform to pre-populate the set of intake forms. Steps such as these may be performed before, during, or after the forms are provided (312) to the intake device (102). After one or more intake forms are created (314) for a particular memorial event, the intake system (10) may determine if there is any information available from various sources that may be used to pre-populate the form. The intake system (10) may determine (316) that information has been provided by friends or family associated with a memorial event, and may use such information to fill (318) fields on one or more forms. Similarly, the intake system (10) may determine that information may be pre-populated based upon location specific (320) information, event specific (324) information, or based upon an intake dossier (328), as described above, and pre-populate the one or more forms accordingly.

As an example, a family member may access the family portal (106) and provide (316) information such as a memorialized person's nickname, photos at various ages, military service history, educational history, work history, religious preferences, and other information. Such information may be used to populate (318) fields on an event planning form (e.g., populate fields relating to educational background so that school colors or logos may be included in the event) or a required form (e.g., populate fields relating to religious based exceptions or requirements relating to preparation for burial).

In another example, the intake system (10) may determine certain information based upon a location (320) of the memorialized person or the location of the memorial event. Such information may be used to populate (322) fields on an event planning form (e.g., populate fields relating to location of the memorial event, driving routes to the memorial event, driving routes from the location of the memorialized person) or a required form (e.g., populate fields relating to regulations for transporting remains).

In another example, the intake system (10) may determine certain information based upon a type (324) of memorial event. Such information may be used to populate (326) fields on an event planning form (e.g., populate fields relating to needed supplies such as a casket or burial plot for a burial, or populate fields relating to crematory services or urns for a cremation) or a required form (e.g., populate fields relating to regulations for cremating remains).

As yet another example, the intake system (10) may determine certain information based upon an intake dossier (328) produced by the intake dossier engine (110). Such information be used to populate (330) fields on an event planning form (e.g., populate fields relating to favorite sports teams, educational background and institutions, workplaces) or a required form.

Fields may be populated from multiple different sources (e.g., family portal (106), intake dossier engine (110), location specific (320) rule) while giving preference to some sources in the event of a conflict. For example, preference may be given to filling (318) forms from the family portal (106) since such information is more likely to be accurate than information produced automatically by an intake dossier, or based upon another rule or process of the intake system (10).

The one or more intake forms may also be displayed (332) via a device such as the intake device (102), allowing a memorial event planner or other user to view the required forms, potentially required forms, and any pre-populated information. Such pre-populated information may be updated, replaced, or removed based upon a user's interactions with the forms via the intake device (102) prior to, during, or after an event planning interview with the associated customer.

Figure 7:
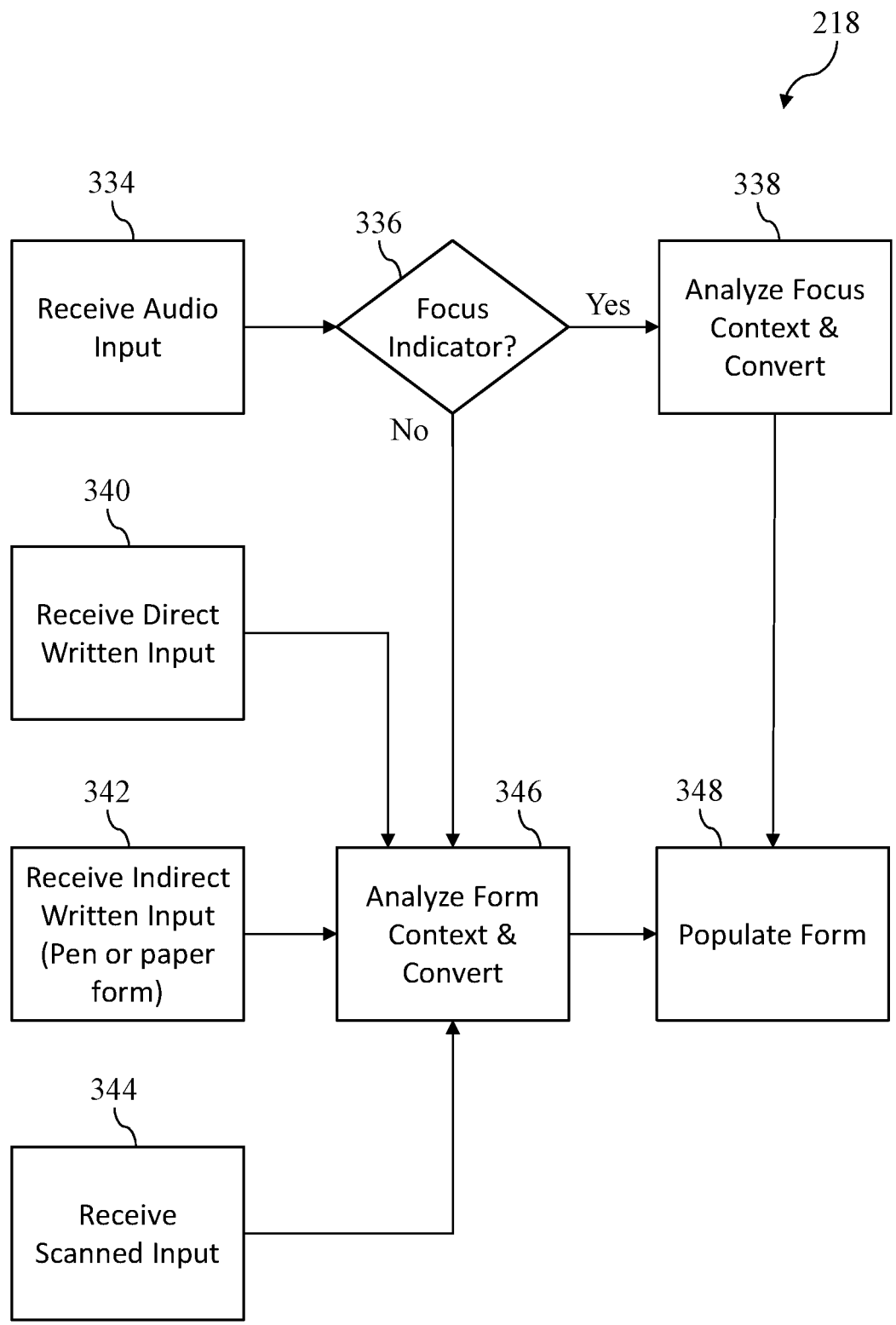
FIG. 7 is a flowchart of an exemplary set of steps that a system could perform to populate the set of intake forms.

Prior steps have described examples of how the intake system (10) may prepare intake forms (e.g., by selecting the appropriate forms and beginning to populate data automatically) and provide them to the intake device (102). FIG. 7 is a flowchart of an exemplary set of steps (218) that a system such as the intake system (10) could perform to populate the set of intake forms via the intake device (102) prior to, during, or after an event planning interview. The intake system (10) may receive inputs via a device such as the input device (102), the secondary input device (118), or other devices that may be used to provide and revise information in the intake forms.

For example, information may be received (334) as audio input via the audio capture device (124) of the user intake device (102), or via the secondary user input (134) of the secondary intake device (118) (e.g., where the secondary intake device (118) is a wearable or other device with audio capture capabilities). Received (334) audio input may include direct voice prompts that may be associated with fields on intake forms (e.g., "The customer's name is John Smith") as well as conversational prompts that may be detected and captured automatically (e.g., "What is the name of the deceased?", in response, "John Smith.").

As another example, information may be received (340 as direct written input, such as where the intake device (102) has a touchscreen user input (122) and display (120). An interface may be displayed via the display (120) that allows the user to browse to provided (312) forms, and use a stylus or other pointing instrument to write text and make selections on a displayed form digitally. As another example, information may be received (342) indirectly, such as where a paper form that mirrors a digital form provided (312) to the intake device (102) is filled out with a smart pen connected as the secondary intake device (118). Information written on the paper form may be automatically captured via the secondary intake device (118), and transmitted to the intake device (102) to digitally fill the form within the intake system (10). As yet another example, information may be received (344) as scanned input, such as where a paper form may be used during an intake interview (e.g., with or without the secondary intake device (118) as described above), and then may be later scanned and digitized by a scanner or other imaging device and provided to the intake system (10).

As information is received from various sources, it may be analyzed (346) in the context of the one or more intake forms and converted into a standardized format for use by the intake system (e.g., audio input may be converted to an integer value, digital written input may be converted into a text string value). Contextual analysis of the input in relation to the one or more intake forms may improve the quality and accuracy of the conversion of input data.

Contextual analysis may include, for example, analyzing and converting information based upon a current field or input on an intake form. In this scenario, the memorial event planner may be viewing an event planning form with five fields for receiving data. Received (334) audio input may include audio of a conversation between he memorial event planner and the customer. When analyzing and converting that audio input into standard data that can be populated on a form, the fact that the event planning form is currently being viewed, as well as a current input field on the form that is being focused on (e.g., as a result of the user touching the field on a touchscreen, or because all prior fields have already been populated), can be used to influence the systems conversion of the audio input. For example, if the audio input is a conversation concerning a venue for the memorial event, and the next empty field on the event planning form is a venue description field, this form context may be used by the intake system (10) to improve its decision making related associating the audio conversation with a venue selection, and selecting venue related keywords form the audio conversation to populate in the venue description field.

Such contextual analysis (346) and conversion may also be useful where input is directly received (340) (e.g., information written on a touchscreen in a notes section may be contextually analyzed and automatically populated to other forms based upon empty fields in those forms), where input is indirectly received (e.g., digital writing captured from the secondary intake device (118) may be contextually analyzed and automatically populated to other forms based upon fields in those forms), or in other instances. After conversion into standard formats, one or more appropriate forms may be populated (348) with the information. For example, when information is captured from a "Name of Deceased" field on an event planning form and converted into text, such information may be populated (348) to one or more forms, form objects, or other data structures for storing such information. When captured from a digital event planning form, the name field may be populated to an event object stored in the event management server (20), may be populated to a regulatory form that also requires a decedent name, or may be populated to a plurality of different forms based upon mappings between those forms and the event planning form (e.g., each form may have a "decedent name field" that is associated with an underlying database field for decedent name, and which can serve as a mapping between forms).

In some implementations receive (334) audio input, the intake device (102) or the secondary device (118) may be interacted with during audio capture to indicate a particular focus (336) on the prior, current, or subsequent audio. For example, the secondary device (118) may have an input button as the secondary user input (134) that may be interacted with by a memorial event planner to indicate that the next (e.g., or prior, current) spoken sentence will be information intended for the current intake form or field. In this manner, an event planner may be able to view an intake form in the intake device (102), and hold the secondary intake device (118) in their hand, and then conversationally discuss details relating to the memorial while using the secondary intake device (118) to focus the intake systems (10) audio analysis on key portions of the conversation. This may advantageously allow the memorial event planner to gather and store various information without requiring that they type, write, or otherwise directly and visibly interface with a computing device, which some customers may find distracting or rude.

When a focus indication is received (336), the intake system (10) may analyze (338) the context of the focus indicator, and convert the audio to form usable the intake forms form based upon the focus context (e.g., and in some cases, also based upon the contextual analysis of the intake forms (346)). Analyzing focus context may depend upon the type of focus indicator that is received or detected (e.g., a fob or wearable secondary intake device (118) may have one or more buttons or other inputs, which each may indicate a different focus context), and the configured response to that focus indicator. Configured responses may include, for example, focusing on the previous, current, or subsequent sentence or period of time, associating audio with a particular intake form, associating audio with a particular intake field, navigating the focus between fields on a form, navigating the focus between forms, and other similar responses. As with prior examples, once converted the information may be populated (348) to one or more other intake forms, data structures, or databases. Variations on the above disclosed systems, features, and methods exist and will be apparent to one of ordinary skill in the art in light of this disclosure.

II. Exemplary Methods for Building Intake Dossier

Figure 8:
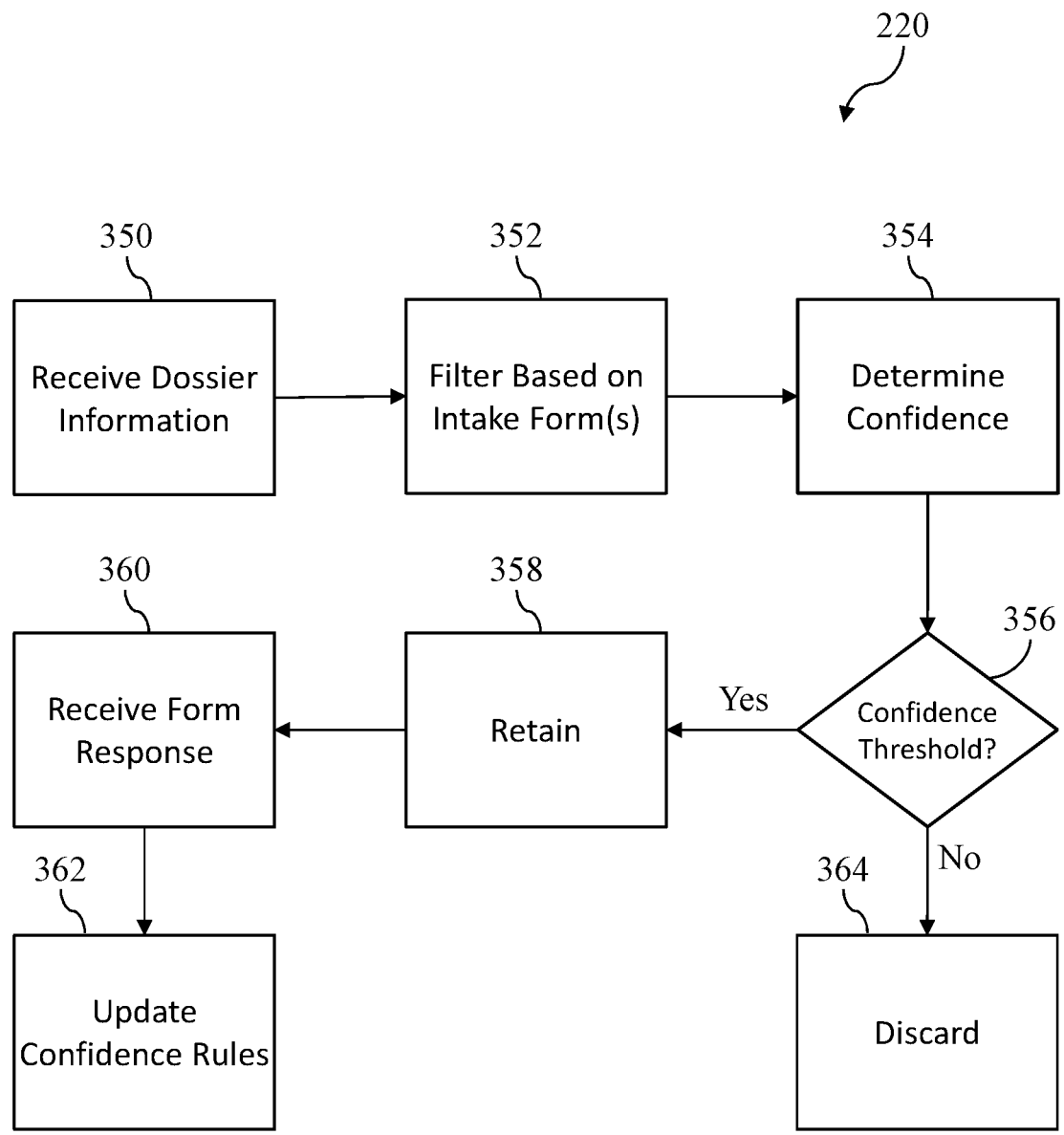
FIG. 8 is a flowchart of an exemplary set of steps that a system could perform to build an intake dossier.

One such variation that may be implemented by some intake systems (10) is the use of an intake dossier to help prepopulate intake forms, as has been described. FIG. 8 shows a flowchart of an exemplary set of steps (220) that a system such as the intake system (10), or the intake dossier engine (110), could perform to build such an intake dossier. Initially, information may be received (350) from one or more sources such as social media sites (112), internet search engines (114), and third-party data streams and sources (116). Information may be received (350) regularly or upon demand, and may be refreshed from time to time after a first contact with a customer that results in the creation (302) of the event data.

Received (350) information may be filtered (352) based upon the provided (312) intake forms. This could include selecting information based upon empty fields in intake forms (e.g., where no information is available on attended colleges or schools, retaining such information from the received (350) information), or filtering information that is not relevant to any current intake forms (e.g., where no form has fields relating to employment history, discarding such information). The intake system (10) may then determine (354) a confidence level for the remaining information, which may include applying rules and contextual analysis of the intake forms and other available information to determine if the remaining information is actually related to the memorialized person in question. For example, where the memorialized person is named "John Smith", some information gathered by the intake dossier may be for other persons named "John Smith." By applying contextual analysis using other available information (e.g., where information provided via the family portal (106) indicates that John Smith never lived in Arizona, discarding any information related to a John Smith in Arizona), a confidence score can be determined for each piece of information.

Where the confidence level for a piece of information is below a confidence threshold (356), it may be discarded (364). Where the information is above the confidence threshold (356), it may be retained (358) and used to pre-populate and fill (330) one or more intake forms, as has been described. The intake dossier engine (110) may additionally track information that is retained (358), such that it may later receive (360) a form response that indicates whether the information retained (358) was revised or removed from the intake forms (i.e., indicating that it may have been incorrect or unhelpful), or whether it was unchanged or otherwise committed to the intake form (i.e., indicating that it was helpful or accurate). Based upon the received (360) responses for information provided by the intake dossier, the intake dossier engine (110) may update (362) its confidence scoring rules. For example, where a piece of information was retained (358) and then later manually removed or revised from an intake form during a customer intake, which may indicate it was inaccurate or unhelpful, confidence scoring for such information (e.g., of that type, from that source, or otherwise having similar characteristics) may be updated (362) so that future inaccuracies may fall below the confidence threshold (356) and be discarded (364). Similarly, where information is retained (358) and unchanged in a final intake form, confidence rules may be updated (362) to improve the likelihood that information having similar characteristics will be above the confidence threshold (356) in the future.

III. Exemplary System for Managing Custody

Figure 9:
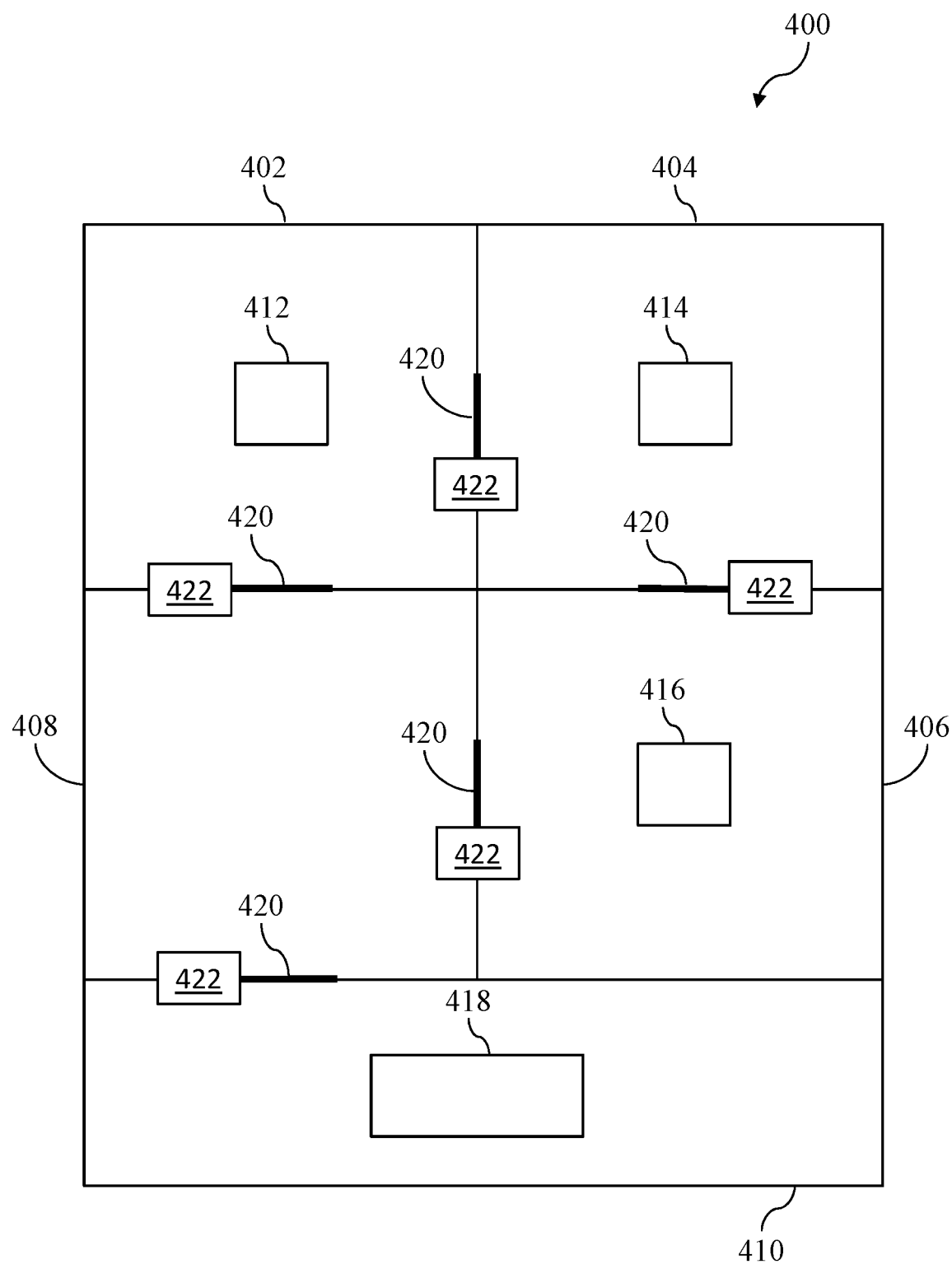
FIG. 9 is a schematic diagram of an exemplary custody tracked environment.

As has been described herein, an important aspect of planning memorial event services is accurately capturing details about the event and the memorialized person. Another important aspect is the accurate and timely completion of tasks related to the planned memorial event. A system such as the intake system (10) may be configured to provide features that may improve the accuracy of task completion, timeliness of task completion, or both, in addition to providing other benefits. Turning to FIG. 9, that figure shows a schematic diagram of an exemplary custody tracked environment (400). A custody tracked environment, such as that shown in FIG. 9, may be one or more buildings or other areas where memorial event services are performed (e.g., a funeral home).

The custody tracked environment (400) of FIG. 9 is comprised of five areas, a transit area (410), a first task area (402), a second task area (404), a third task area (406), and a fourth task area (408). Different task areas are associated with work stations having tools, devices, and other arrangements suitable for different tasks and capabilities. For example, where the custody tracked environment (400) is a funeral home, the first task area (402) and a first station (412) may configured for embalming tasks, the second task area (404) and a second station (414) may be configured for cosmetic tasks (e.g., hair, makeup, clothing), the third task area (406) and a third station (416) may be configured for arrangement in caskets, and the fourth task area (408) may be configured for easy access to the transit area (410), where a vehicle (418) such as a hearse may transport remains to or from the custody tracked environment (400).

Figure 10A:
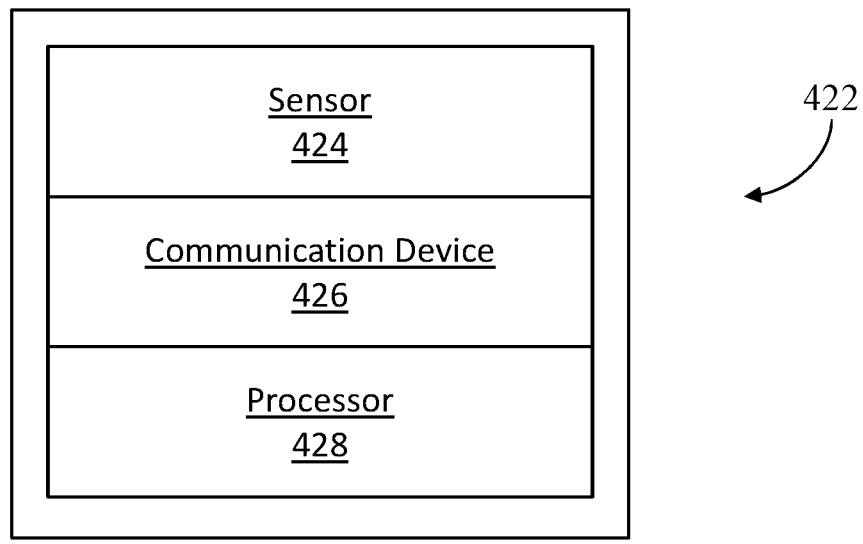
FIG. 10A is a schematic diagram of an exemplary transit sensor that may be used with the custody tracked environment.
Figure 10B:
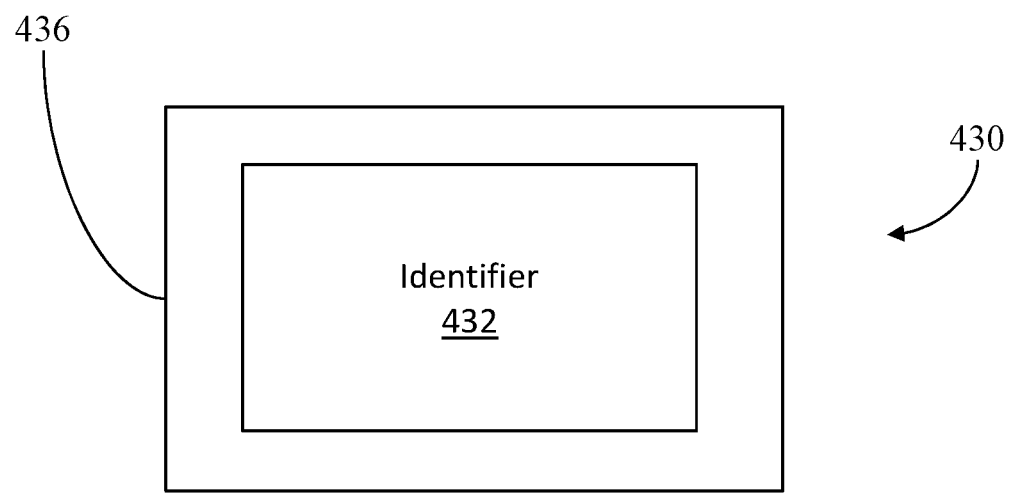
FIG. 10B is a schematic diagram of an exemplary identifier that may be used with the custody tracked environment.

Each point between areas may be configured with custody tracking technology in order to detect and verify the movement of a decedent's remains throughout the process and preparation for the memorial event. As can be seen in FIG. 9, each door (420) or passageway allowing transit between areas is configured with a transit sensor (422) that is operable to detect and identify a decedent's remains as they pass through. The transit sensor (422) may be implemented in varying ways. With reference to FIGS. 10A and 10B, those figures show variations on devices that may be used to implement the transit sensor (422). FIG. 10A shows the transit sensor (422) comprising a sensor (424) operable to receive identifying data during transit between areas, a communication device (426) operable to exchange data with other devices within or in communication with the custody tracked environment (400), and a processor (428) configured to control the operation of the transit sensor (422).

In some implementations, the sensor (424) may be a short range wireless communicator such as a Wi-Fi, Bluetooth, or RFID transceiver, or another wireless transceiver capable of receiving information wirelessly. In such implementations, a corresponding device (e.g., a short-range communication beacon, fob, or chip) may be paired with a deceased's remains such that when the remains pass through the doorway (420), the sensor (424) detects and identifies such a transit.

In other implementations, the sensor (424) may be an optical device capable of capturing image data wirelessly. Such a device may be, for example, a camera, a barcode scanner, a QR code scanner, or another similar device capable of capturing image data. In such implementations, a camera for example may capture image data associated with a deceased person and identify that person using anonymous facial recognition methods. As an example, a deceased may be photographed upon initial intake, and such photographic image data may be converted into anonymous and unique stored data (e.g., data that may uniquely identify the individual, but that cannot be viewed as a photograph in order to retain privacy). Upon passing through a doorway (420), a subsequent photographic data may be similarly converted and used to uniquely identify the deceased. In other implementations, visual data captured may instead be associated with an optical identifier (e.g., a barcode, QR code), and the corresponding optical identifier may be placed on or near the deceased such that it is detected and received by the sensor (424) during transit between areas.

Operating in such a manner, it can be seen that the location and custody of the remains of a plurality of deceased persons may be tracked throughout the custody tracked environment (400). For example, a deceased's remains may arrive in the vehicle (418) and be transported from the transit area (410) to the fourth task area (408), passing through the doorway (420) between those two areas and being registered by the transit sensor (422) at that time. From the fourth task area (408), the remains may proceed to an adjacent task area, again passing through the doorway (420) to that area, and being registered and identified by the transit sensor (422). Each time a transit sensor such as the transit sensor (422) detects transit of remains between areas, such identifying information can be communicated via the communication device (426) to a system configured to track the custody tracked environment (400) (e.g., the intake system (10), the event management server (20)). Such a system may contain various records and data relating to a plurality of deceased individuals (e.g., the identity of an individual, the location of the deceased's remains) and memorial events that are planned for them (e.g., a number of tasks to be performed in preparation for the memorial event).

Such information may be used to, for example, verify that the remains were in the origin location (i.e., if they are not it may indicate an error in the custody tracking system or process), verify that the remains are in transit towards a proper destination (e.g., if a burial is planned for a particular deceased, areas relating to preparation for burial may be proper, while areas relating to preparation for cremation would not be), verify that tasks are being performed in a timely manner (e.g., some tasks in the first task area (402) must be performed 48 hours prior to burial), and may also be used to prevent erroneous performance of tasks. As an example of this, a tool, device, computer, or other workstation device at the first station (412) may be automatically enabled or disabled in response to communications from the transit sensor (422), based upon whether or not the custody tracking system determines that the deceased's remains that are located in the first area (402) require tasks associated with the first station (412). This could include enabling or disabling an embalming machine to prevent erroneous embalming procedures, enabling or disabling a crematorium to prevent erroneous cremation, enabling or disabling the vehicle (418) or a device used to load the vehicle (418) to prevent erroneous transit, or similar actions.

A difficulty with tracking custody within the custody tracked environment (400) is that the uniquely identifying information associated with a deceased's remains should be inseparably associated with the remains in order to mitigate errors. For example, if a cart or other conveyance is used to transport remains within the custody tracked environment (400), it would introduce a significant potential for error if the identifying information (e.g., a wireless fob or chip, a QR code) were simply placed on the cart, as it could fall off, be forgotten, be accidentally swapped with another unique identifier, or other similar errors. In implementations where the transit sensor (422) uses image data and facial recognition to identify and register transit this is not an issue. However, in implementations relying upon an optical identifier or wireless identifier, this can be a problem. Conventionally, identifiers have taken the form of a metal tag that travels with remains throughout the entire process.

However, in some scenarios such tags are removed at various times (e.g., a metal tag is removed before cremation to prevent its destruction) meaning that there is still a potential for error (e.g., where a metal tag is removed before cremation, and then is lost or switched with another tag before it is associated with ashes from the cremation). Wireless identifier and optical identifiers have similar challenges as metal tags in such situations. FIG. 10B shows a schematic diagram of an exemplary identifier (430) that may be used with the custody tracked environment (400) in such scenarios. The identifier (430) comprises a unique identifier (432) that stores unique identifying information that is usable by the transit sensor (422), and a protectant (436) that is selected to protect the unique identifier (432) throughout one or more tasks relating to preparation for a memorial event.

For example, in the case of a cremation, the unique identifier (432) may be an optical barcode that is printed, etched, or engraved into a metal or stone protectant (436) with a melting point that would allow the unique identifier (432) to survive the cremation process. As another example, the unique identifier (432) may be a heat shielded wireless communication chip that is embedded within the protectant (436), which itself is made from one or more heat resistant, reflective, or shielded materials, such that the unique identifier (432) remains functional throughout the cremation process. In this manner, the identifier (430) is never separated from the remains, further mitigating the risk of error. Other configurations, constructions, components, and materials for the identifier (430) exist and will be apparent to one of ordinary skill in the art in light of the disclosure herein.

IV. Exemplary Methods for Custody Driven Task Management

As discussed above, tracking custody of the remains of a deceased throughout the process of preparing for a memorial event provides a number of advantages. In addition to reducing errors, such features may also be used to drive the performance and management of tasks related to a memorial event. This can be accomplished through automation (e.g., enabling and disabling tools or devices based upon custody tracking) as well as through notification (e.g., providing information to those performing tasks).

Figure 11:
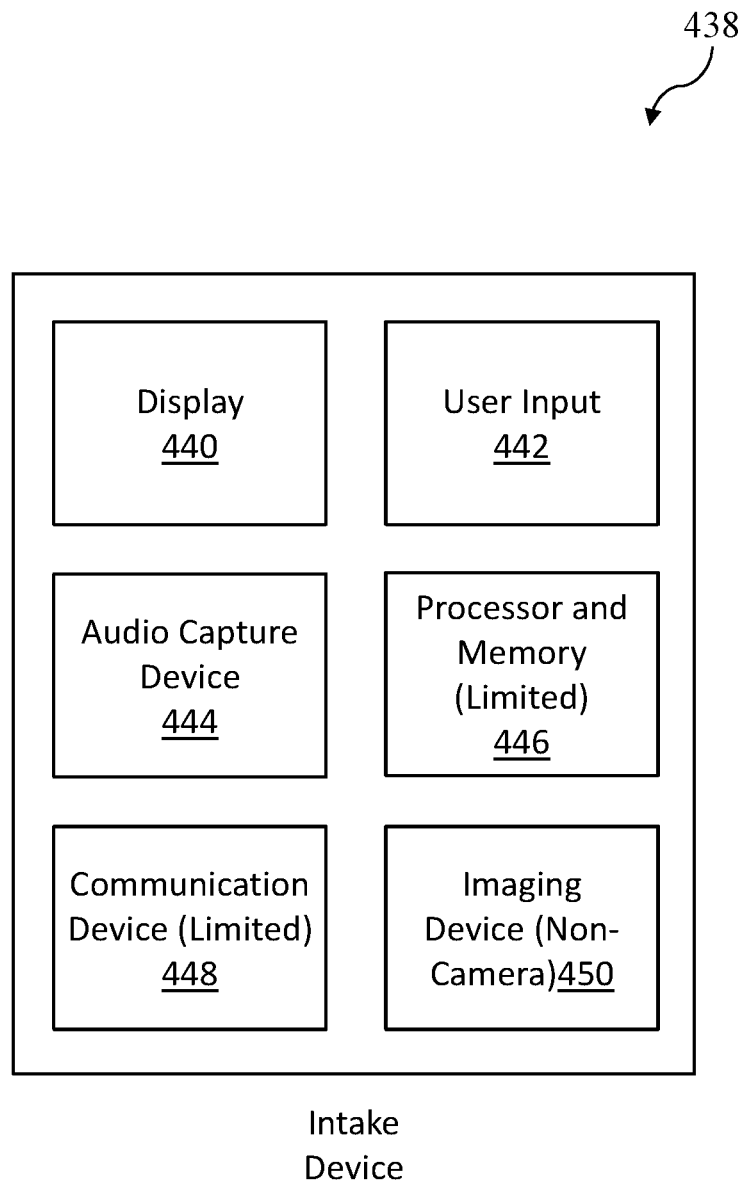
FIG. 11 is a schematic diagram of an exemplary task device that may be used with the custody tracked environment.

FIG. 11 is a schematic diagram of an exemplary task device (438) that may be used with the custody tracked environment (400) or other systems in order to provide notifications and task directions to users. The task device (438) may be the same or similar device as the intake device (102), and may be, for example, a smartphone, tablet, laptop, kiosk, proprietary computing device (e.g., a wall mounted or surface mounted touch display and computer), or other computing device. A display (440), user input (442), audio capture device (444), processor and memory (446), communication device (448) and imaging device (450) have similar features and capabilities as those described in relation to the intake device (102).

The task device (438) may have additional features and limitations that make it appropriate for interactions with the custody tracked environment (400). For example, in some implementations, the processor and memory (446), the communication device (448), and the imaging device (450) may have limitations placed on them by software, hardware, or both, in order to ensure a level of privacy and anonymity that is appropriate for memorial event services. For example, in some implementations the processor and memory (446) may be configured such that the task device (438) only stores and processes a minimal amount of data (e.g., as a thin client), and data is instead primarily passed to and handled by a different system (e.g., the intake system (10), the event management server (20)).

As another example, the communication device (448) may be configured in such a way that communication is only possible with other components and devices within the custody tracked environment (400), in order to prevent accidental or intentional communications with unauthorized devices via the task device (438). As another example, the imaging device (450) may be implemented as a non-photographic imaging device that is capable of capturing unique facial data from a person, but is incapable of producing photographic images of the person that are stored on the task device (438) or elsewhere. For example, the imaging device (450) may have additional processing components and instructions that cause it to provide pre-anonymized facial image data to the processor and memory (446) upon capture, rather than producing photographic images that are later converted.

The task device (438) may be useful both for providing notifications to task providers relating to custody and location of remains, past, present, and future tasks, and may also additionally serve as a mobile custody tracker that could be used to manually identify and confirm the location of remains within the custody tracked environment (400). Particular implementations of the task device (438) may have additional capabilities. For example, in some implementations the task device (438) could be vertically mounted near an embalming station such as the first station (412), or horizontally integrated with the embalming station (e.g., as one or more touch screen interfaces at the edge of a table for preparation of remains). This may be useful where, for example, a service provider that is performing tasks related to remains may wish to record data using the audio capture device (444), or interact directly with the horizontally or vertically mounted user input (442) to provide information related to tasks that are being performed (e.g., supplies being used, comments on the condition or appearance of remains, tasks that have been or will be performed).

Figure 12:
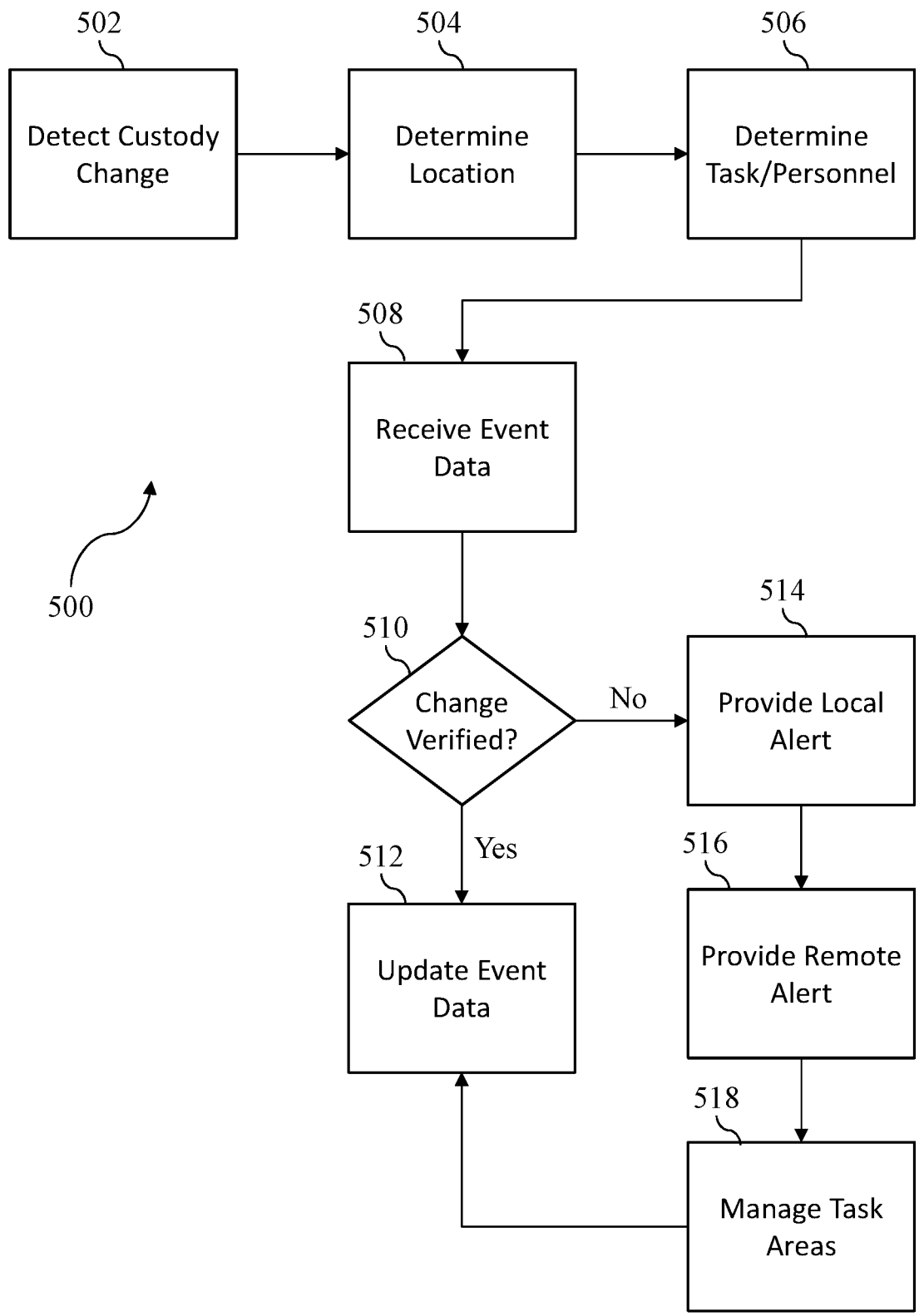
FIG. 12 is a flowchart of an exemplary set of steps that a system could perform to monitor and manage chain of custody.
Figure 13:
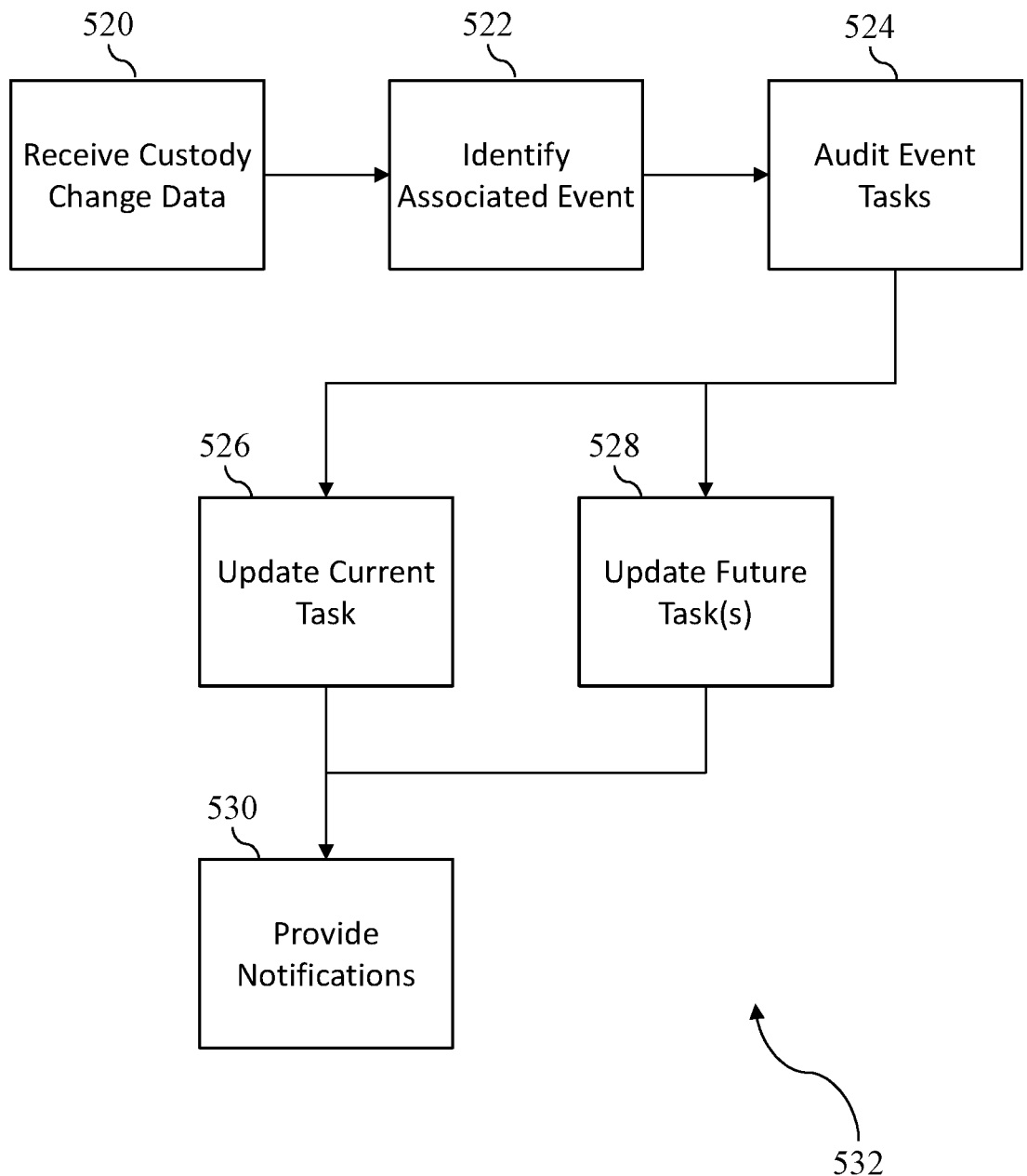
FIG. 13 is a flowchart of an exemplary set of steps that a system could perform to drive memorial events based upon changes in custody.

Turning now to FIGS. 12 and 13, those figures show methods that may be performed by a system within an environment such as the custody tracked environment (400). FIG. 12 is a flowchart of an exemplary set of steps (500) that a system such as the intake system (10) or the event management server (20) could perform to monitor and manage chain of custody of remains. Whenever a custody change is detected (502) as a result of the transit sensor (422) identifying remains moving between areas, the system may determine (504) the location of the transit (e.g., the origin and the destination of the remains) and may also determine (506) if there are one or more tasks or personnel associated with the remains in the origin or the designation (e.g., were all tasks completed at the origin prior to transit between areas, are there tasks still to be completed at the destination). Such determinations may be based upon received (508) event data from the event management server (20) or another source that describe one or more tasks associated with the remains, as well as their status and other information associated with the memorial event that is uniquely associated with those remains.

Based upon the received (508) data and the determined (504) location and tasks (506), the system may determine if the change in custody (e.g., the transit between areas) can be verified (510) as related to the timely performance of necessary tasks. For example, where the information indicates that remains are moving to the transit area (410), the system may determine that there are tasks still be performed in the third task area (406) prior to moving to the transit area (410). Such a change would not be verifiable (510), and may indicate some confusion or error on the part of the service providers. Where the change cannot be verified (510), the system may provide (514) a local alert to the service provider (e.g., as an audible, visual, or haptic alert via the task device (438), or an audible or visual alert from an indicator near the door (420)). The system may also provide (516) one or more remote alerts, which may be electronic messages or notifications to supervisors, other service providers, or other personnel that some confusion or error has occurred within the custody tracked environment (400). The system may also manage (518) one or more task areas based upon the change. This could include, for example, enabling or disabling accessibility, usability (e.g., disabling the first station (412) to prevent its use), or other changes intended to automatically mitigate the error. Continuing the earlier example, this could include managing (518) an automatic door that allows the vehicle (418) to enter or leave the transit area (410), disabling the vehicle (418) itself, or other preventative actions.

Where the change can be verified (510), the system may update (512) the event data on the event management server (20) or elsewhere to reflect that the change occurred, and to update any tasks associated with the change. For example, where a set of remains move between the first task area (402) and the second task area (404), data on the event management server (20) may be updated (512) to reflect that a first task, having a status indicating that it had been started in the first task area (402), is now complete, and that a second task, having a status indicating that it should be started in the second task area (404), is now in progress.

In addition to verifying transit of remains, the system may also drive performance and management of tasks based upon information generated during transit. In this manner, the system as a whole can manage tasks more immediately than a task management system that simply defines a number of tasks and an anticipated time of their completion. For example, some conventional task management systems may provide a number of tasks and their associated deadlines, but may be unable to update deadlines, order, or priority of tasks in reaction to real world events. Using the steps of FIG. 13, a system such as the event management server (20) could manage tasks in real time based upon information provided by the custody tracked environment (400).

Upon receiving (520) information indicating a change of custody (e.g., as a result of remains being identified as in transit between areas by the transit sensor (422)), the event management server (20) may identify (522) the memorial event associated with the remains and audit (524) a plurality of tasks associated with that memorial event in order to determine which tasks have been completed, which are currently underway, and which still need to be completed. Tasks may be stored on the event management server (20) indicating approximate times that they should be started or completed, or other required events or tasks that must be completed prior to their start or completion. The system may be configured to audit (524) those tasks by determining, for each task, whether sufficient time remains to complete the task and whether tasks are being performed in an appropriate order, and may also determine for each task whether and when certain preceding tasks should be initiated.

For example, when the system detects that a decedent is moving from the fourth task area (408) to the transit area (410), the system may identify a burial event associated with that decedent. The system may audit (524) tasks related to that event, and determine that flowers must be still be delivered to the burial site prior to the start of the memorial event. It may not be desirable to deliver flowers earlier, or whenever is convenient for the florist, as they may wilt or die in the sun and heat. To address this issue, the system may be configured to, after the audit (524), update (526) a current task associated with the decedent (e.g., update a task associated with travel to the burial site to reflect that it is now in progress) and may also update (528) one or more future tasks associated with the decedent, such as updating a "deliver flowers" task to reflect that it is now in progress. When the current (526) or future (528) task is updated, the system may also provide one or more notifications (530) related to the task. This could include, for example, notifying (530) a funeral director that the deceased is in transit to the burial site based upon the current task update (526), or notifying (530) a flower delivery agent to begin taking steps to deliver the flowers based upon the future task update (528). By driving such updates and notifications automatically based upon changes in the custody tracked environment (400), the system can operate individually or in addition to other features and systems in order to further mitigate errors relating to memorial events.

V. Miscellaneous

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A system for planning memorial events comprising:
   (a) an intake server configured to store a plurality of fillable forms associated with the planning and performance of memorial events, wherein each of the plurality of fillable forms comprises a set of fillable fields;
   (b) an intake device in communication with the intake server, and configured to be usable by a planner user for planning events for a memorial provider;
   wherein the intake server is configured to:
   (i) receive an initial memorial event dataset indicating that a memorial event will be planned;
   (ii) determine a set of forms, from the plurality of fillable forms, that are associated with the memorial event based upon the initial memorial event dataset;
   (iii) add data to the set of fillable fields of one or more of the set of forms based upon the initial memorial event dataset;
   (iv) provide the set of forms to the intake device; and
   (v) add data to set of fillable fields based upon a set of interview responses received from the intake device;
   wherein the intake device is configured to:
   (A) display a form of the set of forms to the planner user during an interview associated with the memorial event;
   (B) receive a set of inputs associated with the set of fillable fields for the form via a user input of the intake device; and
   (C) create the set of interview responses based upon the set of inputs.

2. The system of claim 1, wherein the set of forms comprise forms that are required for the memorial event by a law or regulation and forms that are required by the memorial provider.

3. The system of claim 1, wherein the intake server is further configured to:
   (a) after receiving the initial memorial event dataset, determine a set of contact information for one or more persons associated with the memorial event;
   (b) provide an invitation to access a family portal to the one or more persons using the set of contact information;
   (c) receive a set of portal information via the family portal, from the one or more persons, wherein the set of portal information is associated with the memorial event; and
   (d) add data to the set of fillable fields of one or more of the set of forms based upon the set of portal information.

4. The system of claim 1, wherein the intake server is configured to store a data mapping that associates each of the set of fillable fields with a corresponding standard field, and wherein the intake server is further configured to:
   (a) receive a custom form from the memorial provider;
   (b) identify one or more fillable fields of the custom form;
   (c) map each of the one or more fillable with their corresponding standard field; and
   (d) provide the custom form to the intake device for that memorial provider in the set of forms instead of a corresponding standard form of the plurality of fillable forms.

5. The system of claim 1, wherein the intake server is further configured to:
   (a) determine a location of the memorial provider based upon the initial memorial event dataset; and
   (b) determine the set of forms that are associated with the memorial event based upon the initial memorial event dataset and the location.

6. The system of claim 1, wherein the intake server is further configured to:
   (a) determine whether the memorial event is associated with a cremation based upon the initial memorial event dataset;
   (b) determine whether the memorial event is associated with a burial based upon the initial memorial event dataset; and (c) determine the set of forms that are associated with the memorial event based upon the initial memorial event dataset, and whether the memorial event is associated with the cremation or the burial.

7. The system of claim 1, further comprising an intake dossier engine, wherein the intake dossier engine is configured to:
(a) receive a social media dataset associated with the memorial event based upon the initial memorial event dataset;
(b) receive a search engine dataset associated with the memorial event based upon the initial memorial event dataset; and
(c) create an intake dossier based upon the social media dataset and the search engine dataset, and associate the intake dossier with the memorial event.

8. The system of claim 7, wherein the intake server is further configured to add data to the set of fillable fields of one or more of the set of forms based upon the intake dossier, and wherein the intake dossier is configured to be displayed by the intake device during the interview.

9. The system of claim 1, wherein the intake device is configured to receive the set of input via a touchscreen of the intake device as written input, wherein the intake device is further configured to:
(a) determine a form context based upon a current form of the set of forms that is displayed when the set of input is received; and
(b) convert the written input into a standardized input based upon the form context.

10. The system of claim 1, wherein the intake device is configured to receive the set of input via an audio capture device of the intake device as audio input, wherein the intake device is further configured to:
(a) determine a form context based upon a current form of the set of forms that is displayed when the set of input is received; and
(b) convert the audio input into a standardized input based upon the form context.

11. The system of claim 10, the intake device further comprising an external secondary device, wherein the external secondary device comprises a user input operable to provide a focus indicator to the intake device, and wherein the intake device is further configured to convert the audio input into the standardized input based upon the form context and the focus indicator.

12. A system for tracking custody of a decedent during performance of one or more tasks required for a memorial event comprising:
(a) a tracked environment comprising a set of locations connected by a set of openings;
(b) a set of transit sensors operable to generate information indicating the location of a decedent within the tracked environment;
(c) a custody server in communication with the set of transit sensors and configured to store a set of decedent information describing the decedent and the memorial event;
wherein the custody server is configured to:
(i) receive a registration indicating that the decedent has entered the tracked environment, and set the decedent's location as a first location of the set of locations;
(ii) receive a transit indication from the set of transit sensors indicating that the decedent has been moved from the first location to a second location of the set of locations through an opening of the set of openings;
(iii) set the decedent's location as the second location;
(iv) determine whether the second location is associated with any task of the one or more tasks;
(v) where the second location is not associated with any task, provide an alert to a provider responsible for the decedent.

13. The system of claim 12, the system further comprising a wireless beacon, the wireless beacon comprising:
(a) a protective coating configured to survive a cremation process; and
(b) a memory positioned within the protective coating, the memory configured to store a unique identifier and provide the unique identifier to the wireless transceiver;
wherein the transit sensor is a wireless transceiver positioned at the opening and operable to detect when the wireless beacon is proximate to the opening and receive the unique identifier, and wherein the custody server is further configured to associate the unique identifier with the decedent.

14. The system of claim 12, wherein the transit sensor is an optical sensor positioned at the opening and operable to capture a set of facial image data from the decedent when the decedent passes through the opening, and wherein the custody server is configured to:
(a) store a facial identifier associated with the decedent, wherein the facial identifier is not viewable as an image and is configured to be used to validate the set of facial image data;
(b) authenticate the set of facial image data with the facial identifier to confirm the identity of the decedent passing through the opening; and
(c) discard the set of facial image data.

15. The system of claim 14, further comprising a task device in communication with the custody server, wherein the task device comprises an imaging device operable by the provider to capture the set of facial image data from the decedent, and wherein the task device is further configured to:
(a) prevent the set of facial image data from being stored on a memory of the task device;
(b) convert the set of facial image data into a facial capture, wherein the facial capture is not viewable as an image and is configured to be validated by the facial identifier; and
(c) provide the facial capture and a current location of the task device to the custody server, wherein the current location is within the set of locations.

16. The system of claim 15, the task device further comprising a set of communication devices capable of sending and receiving data to remote devices, wherein the task device is further configured to prevent the set of communication devices from sending data to any remote device other than the custody server.

17. The system of claim 12, wherein:
(a) the first location is a transit area comprising a vehicle that the decedent arrived in,
(b) the second location is a task area where one or more tasks relating to the memorial event will be performed on the decedent, and
(c) a third location of the set of locations is a storage area where the decedent can be stored until the occurrence of the memorial event.

18. The system of claim 12, wherein the custody server is further configured to, where the second location is associated with a task of the one or more tasks, provide an indication to an event management server that the task is currently underway.

19. The system of claim 18, wherein the custody server is further configured to, when the decedent leaves the second location, provide an indication to the event management server that the task is complete.

20. A system comprising:
(a) an intake server configured to store a plurality of fillable forms associated with the planning and performance of memorial events, wherein each of the plurality of fillable forms comprises a set of fillable fields;
(b) an intake device in communication with the intake server, and configured to be usable by a planner user for planning events for a memorial provider;
(c) a set of transit sensors operable to generate information indicating the location of a decedent within a tracked environment;
(d) a custody server in communication with the set of transit sensors; and
(e) an event management server configured to generate one or more tasks required for the memorial event based upon a set of completed forms;

wherein the intake server is configured to:
(i) provide a set of fillable forms to the intake device, wherein the set of fillable forms is required for a memorial event associated with a decedent; and
(ii) add data to set of fillable fields based upon a set of interview responses received from the intake device to produce the set of completed forms and provide the set of completed forms to the event management server;

wherein the custody server is configured to:
(A) receive a transit indication from the set of transit sensors indicating that the decedent has been moved from a first location to a second location through an opening;
(B) determine whether the second location is associated with any task of the one or more tasks; and
(C) where the second location is not associated with any task, provide an alert to the memorial provider.

* * * * *